(12) United States Patent
Large

(10) Patent No.: US 10,261,233 B2
(45) Date of Patent: Apr. 16, 2019

(54) BACKLIGHT UNIT WITH CONTROLLED LIGHT EXTRACTION

(71) Applicant: Microsoft Technology Licensing, LLC, Redmond, WA (US)

(72) Inventor: Timothy Large, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 154 days.

(21) Appl. No.: 14/552,762

(22) Filed: Nov. 25, 2014

(65) Prior Publication Data

US 2016/0147006 A1    May 26, 2016

(51) Int. Cl.
    *F21V 8/00*    (2006.01)

(52) U.S. Cl.
    CPC ......... *G02B 6/0036* (2013.01); *G02B 6/0053* (2013.01); *G02B 6/0055* (2013.01)

(58) Field of Classification Search
    CPC combination set(s) only.
    See application file for complete search history.

(56) References Cited

U.S. PATENT DOCUMENTS

| | | | |
|---|---|---|---|
| 5,202,950 | A | 4/1993 | Arego et al. |
| 7,241,040 | B2 | 7/2007 | Ahn et al. |
| 7,728,923 | B2 | 6/2010 | Kim et al. |
| 7,815,358 | B2 | 10/2010 | Inditsky |
| 8,130,341 | B2 | 3/2012 | Papakonstantinou et al. |
| 8,353,617 | B2 | 1/2013 | Montgomery et al. |
| 8,477,267 | B2 | 7/2013 | Fujisawa et al. |
| 8,523,419 | B2 | 9/2013 | Nevitt et al. |
| 8,588,574 | B2 | 11/2013 | Gardiner et al. |
| 2004/0076396 | A1* | 4/2004 | Suga ............ G02B 6/0036 385/146 |
| 2006/0002675 | A1* | 1/2006 | Choi ............ G02B 6/0038 385/129 |
| 2006/0250542 | A1 | 11/2006 | Liu et al. |
| 2007/0281129 | A1 | 12/2007 | Chan et al. |

(Continued)

FOREIGN PATENT DOCUMENTS

| CN | 101889224 A | 11/2010 |
|---|---|---|
| EP | 2068180 A1 | 6/2009 |

(Continued)

OTHER PUBLICATIONS

S.K. Lim, "LCD Backlights and Light Sources", Proceedings of the 9th Asian Symposium on Information Display, Oct. 8, 2006, 4 pages.

(Continued)

*Primary Examiner* — Lauren Nguyen
(74) *Attorney, Agent, or Firm* — Ray Quinney & Nebeker P.C.; Paul N. Taylor

(57) ABSTRACT

A backlight unit includes a light guide layer including a plurality of extraction features disposed along a rear face of the light guide layer, a first cladding layer adhesively secured to the rear face of the light guide layer, a plurality of turning structures disposed along the first cladding layer, and a second cladding layer adhesively secured to a front face of the light guide layer. The first cladding layer has a first refractive index lower than a guide refractive index of the light guide layer. The second cladding layer has a second refractive index lower than or equal to the first refractive index.

20 Claims, 3 Drawing Sheets

(56) References Cited

U.S. PATENT DOCUMENTS

| | | | |
|---|---|---|---|
| 2011/0051460 A1* | 3/2011 | Montgomery | G02B 6/0038 362/620 |
| 2011/0262092 A1* | 10/2011 | Large | G02B 6/0046 385/129 |
| 2011/0273377 A1 | 11/2011 | Merz | |
| 2011/0273906 A1* | 11/2011 | Nichol | G02B 6/0076 362/607 |
| 2012/0200802 A1 | 8/2012 | Large | |
| 2013/0070480 A1* | 3/2013 | Griffin | G02B 6/0028 362/612 |
| 2013/0222353 A1 | 8/2013 | Large | |
| 2014/0085570 A1 | 3/2014 | Kuwata et al. | |
| 2014/0092630 A1 | 4/2014 | Franklin et al. | |
| 2014/0119056 A1 | 5/2014 | Chang et al. | |
| 2014/0169034 A1 | 6/2014 | Chen | |

FOREIGN PATENT DOCUMENTS

| | | | | |
|---|---|---|---|---|
| EP | 2 157 366 | * | 2/2010 | F21V 8/00 |
| WO | 2013122730 | | 8/2013 | |

OTHER PUBLICATIONS

U.S. Appl. No. 13/923,889, Large, et al., "Hybrid Concentrator for a Backlight", filed Jun. 21, 2013.

U.S. Appl. No. 61/236,043, Large, et al., "Light Input Concentrator", filed Aug. 21, 2009.

"International Search Report and Written Opinion Issued in PCT Application No. PCT/US2015/060247", dated Mar. 1, 2016, 13 Pages.

"International Preliminary Report on Patentability Issued in PCT Application No. PCT/US2015/060247", dated Feb. 9, 2017, 9 Pages.

"Written Opinion Issued in PCT Application No. PCT/US2015/060247", dated Oct. 17, 2016, 7 Pages.

"First Office Action and Search Report Issued in Chinese Patent Application No. 201580064143.1", dated Dec. 13, 2018, 13 Pages.

\* cited by examiner

BACKLIGHT UNIT WITH CONTROLLED LIGHT EXTRACTION

DESCRIPTION OF THE DRAWING FIGURES

For a more complete understanding of the disclosure, reference is made to the following detailed description and accompanying drawing figures, in which like reference numerals may be used to identify like elements in the figures.

Figures 1, 2, 3:
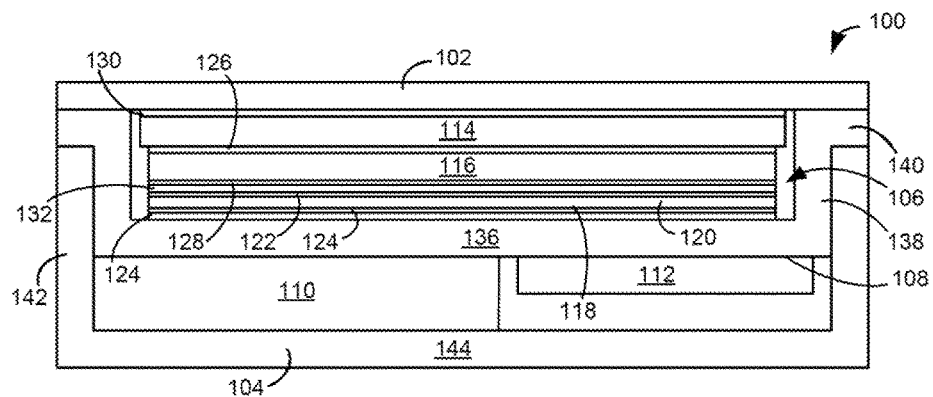
FIG. 1 is a schematic, exploded, perspective view of an electronic device having a display in accordance with one example.
FIG. 2 is a partial, schematic, cross-sectional view of a laminated backlight unit of a display in accordance with one example.
FIG. 3 is a partial, schematic, cross-sectional view of the laminated backlight unit of FIG. 2 with exemplary light rays guided and extracted in accordance with one example.

While the disclosed devices and systems are susceptible of embodiments in various forms, specific embodiments are illustrated in the drawing (and are hereafter described), with the understanding that the disclosure is intended to be illustrative, and is not intended to limit the invention to the specific embodiments described and illustrated herein.

DETAILED DESCRIPTION

A display of an electronic device has a backlight unit to illuminate a liquid crystal display (LCD) panel. The backlight unit may include a plurality of light management films or other layers adhesively secured to one another. The films or layers may include cladding layers adhesively secured to front and rear faces of a light guide layer through which light reflectively propagates before extraction. The cladding layers and the light guide layer may be configured such that light is controllably extracted from the light guide layer through the rear face of the light guide layer. The light exits the light guide layer at a controlled angle (rather than a randomized angle due to scattering) as a result of interaction with extraction features disposed along the rear face of the light guide layer. Controlling the extraction of light to a selected range (e.g., a few degrees or other small or very small range) of angles may be used to provide a tight exit distribution and, thus, a narrow viewing angle display. For example, the display may increase the amount of illumination directed toward the viewer, as opposed to either side of the viewer. The viewing angle may be narrower than that achievable in other backlight units, such as those in which a limit on the width of the viewing angle is established by recycling or brightness enhancement films. The narrower viewing angle may, in turn, provide an opportunity to reduce the power consumption of the display, as less light is wasted illuminating areas outside of the viewer.

The configuration of the cladding layers may support the controlled extraction. For instance, the cladding layers may have refractive indices offset from one another. The cladding layer secured to the front face of the light guide layer may have a lower refractive index than the cladding layer secured to the rear face. The difference in refractive indices and the configuration of the extraction features may ensure that light is extracted from the light guide layer in a rearward direction.

The configuration of the cladding layers and the extraction features of the backlight unit may produce an intrinsically narrow viewing cone. The backlight unit may produce the narrow viewing cone without having to place one or more prism films onto the backlight unit in an effort to increase on-axis luminance. While such prism films may improve on-axis luminance over a completely diffuse display by a factor of about five, the cladding layers and extraction features may improve luminance by a factor of about ten. The intrinsic production of the narrow viewing cone may be achieved by avoiding the scattering that randomizes the light before reaching such prism films. Avoiding that randomization allows the backlight unit to maintain the directional characteristics of the light propagating through the light guide layer.

Each extraction feature may be or include a prism-shaped indentation in the light guide layer. The cladding layer secured to the rear face may be disposed within each indentation. The indentations allow light propagating within a selective range of angles to exit the light guide layer. The range of angles may be limited to a narrow range of angles by the shallow or low profile shape of the indentations. The narrow range of angles allowed to exit the light guide layer leads to a narrow range of exit angles from the display. The light directed toward the viewer may thus fall within a tight exit distribution. A narrow viewing angle display may thus be achieved.

The light extracted from the light guide layer may reflect off of one of a plurality of turning structures to redirect the light toward the viewer. Using reflection (rather than scattering) for redirection maintains the controlled nature of the light extraction. Each turning structure may be a prism-shaped structure carried on a film adhesively secured to the cladding disposed along the rear face of the light guide layer. Light encountering the turning structures is reflected forward toward the viewer in a direction that corresponds with the propagation angle of the light within the light guide layer. Because of the selective extraction of the extraction features, the light emitted by the backlight unit may thus exhibit a desired directionality. As a result, the display may exhibit a narrower viewing angle.

Some or all of the constituent films or layers of the backlight unit may be adhesively secured to one another. For instance, the backlight unit may be configured as a laminated structure to form a solid film assembly. Adhesion of adjacent films or layers of the backlight unit may prevent or minimize relative movement of the constituent layers of the backlight unit. Such movement may otherwise occur if the constituent films or layers are free floating. For example, the adhesion of the constituent layers may prevent or minimize any wrinkling or buckling of the layers due to mechanical over-constraint or differences in thermal expansion. Mura defects or other non-uniformities in display output may thus be avoided or minimized.

The adhesion of the films may also allow the thickness of the films to be decreased to or toward a minimum optically functional thickness. For instance, film thicknesses used in backlight units to maintain flatness may thus be avoided.

The solid nature of the backlight unit may allow the backlight unit to be bonded to the LCD panel. A robust, solid display module may thus be established. For instance, the solid nature of the display module may prevent or minimize problems arising during operation, such as issues arising from flexure of touchscreen displays.

The constituent layers of the backlight unit may be composed of materials and/or otherwise constructed and/or configured to facilitate and utilize the lamination. For instance, cladding layers may be adhesively secured to front and rear faces of a light guide layer. In some cases, the cladding layers are provided by respective adhesive materials.

Although described in connection with electronic devices having touchscreens, the internal support may be used in connection with a wide variety of electronic devices, including those not having a touch-sensitive display. The size and form factor of the electronic device may vary considerably. Devices may range from wearable or handheld devices to televisions or other wall-mounted displays or other large-scale devices. Although various aspects of the backlight unit are described herein, the composition and other characteristics of the other components of the display module and the electronic device may vary.

FIG. 1 is a cross-sectional view of an electronic device 100 having a transparent cover 102, a shell 104, and a display module 106 disposed between the transparent cover 102 and the shell 104. The transparent cover 102 may include or be composed of glass, plastic, and/or other transparent materials. In this example, the transparent cover 102 and/or the display module 106 are supported by an internal support 108. The internal support 108 is disposed between the transparent cover 102 and the shell 104. The display module 106 is disposed on a front or forward-facing side of the internal support 108. In this example, the electronic device 100 includes a battery 110 and an electronics module 112 disposed on a rear or rearward-facing side of the internal support 108. As described below, the display module 106, the battery 110, the electronics module 112, and/or other internal components of the electronic device 100 may be adhesively or otherwise secured or mounted to the internal support 108. In other cases, the device 100 does not include the internal support 108.

The display module 106 may be configured as a display module stack. The display module stack 106 may include any number of optical layers or films. Each layer of the display module stack 106 may be structurally supported by the internal support 108. In this example, the display module stack 106 includes a touch sensor unit 114, an LCD unit (or panel) 116, and a backlight unit 118. The touch sensor unit 114 may include one or more layers formed on, applied to, or otherwise secured to the transparent cover 102 and/or the remainder of the display module stack 106. The LCD unit 116 may include one or more layers disposed between the touch sensor unit 114 and the backlight unit 118. The backlight unit 118 may include a light guide layer (or plate) 120 and front and rear cladding layers 122 and 124. The cladding layers 122, 124 are disposed on and along front and rear faces (or sides) of the light guide layer 120, respectively. The cladding layers 122, 124 may be adhesively secured to the front and rear faces. The backlight unit 118 may include any number of additional light management films or layers. Examples of light management films and layers are schematically shown and described in connection with FIGS. 2 and 3.

Adjacent units, layers or other elements or components of the display module 106 may be bonded together or otherwise secured to one another. For example, the touch sensor unit 114 may be bonded to the LCD panel 116. The LCD panel 116, may, in turn, may be bonded to the backlight unit 118. The display module 106 may also be bonded or otherwise secured to the transparent cover 102. Adjacent units or panels of the display module 106 may be contiguous with one another with the exception of an adhesive layer or film therebetween. In the example of FIG. 1, adhesive layers 126, 128 are used to secure adjacent units of the units 114, 116, 118 to one another. The bonding of adjacent units may lead to the absence of air gaps therebetween. An upper (or front) surface of the display module 106 may also be bonded to the transparent cover 102. In the example of FIG. 1, an adhesive layer 130 is used to secure the touch sensor unit 114 to the transparent cover 102. Another adhesive layer may be used at a lower (or rear) surface of the display module 106 to secure the backlight unit 118 to the internal support 108.

The electronic device 100 may include fewer, additional, or alternative display-related components. For example, in some cases, one or more components of the display module 106 may also serve as the transparent cover 102. For instance, rather than having a separate, additional cover, one of the layers or components of the display module may be used as an external display layer. For example, the external display layer may be or include an external polarizer of the LCD panel 116. The external polarizer may include a hard coating (e.g., powdered or nano-scale glass in a polymer binder) for protection during use. Alternatively or additionally, a color filter glass layer of the LCD panel 116 may be configured and disposed to act as a glass substrate for the external display layer. In such cases, a touch sensor layer may be formed upon or added to the color filter glass layer in an in-cell touch sensor arrangement. Other touch display arrangements may be used.

Each unit of the display module 106 may also be configured as a solid stack of layers or films. The constituent layers or films of the backlight unit 118 may be bonded to one another. For example, the constituent films or layers of the backlight unit 118 may be configured as laminated constituent films or other layers. The backlight unit 118 may thus lack air gaps between constituent layers thereof. Adjacent layers or films of the backlight unit 118 may be contiguous with one another with the exception of an adhesive layer or film therebetween. In the example of FIG. 1, the front and rear cladding layers 122, 124 are, in fact, adhesive layers or films. The front and rear cladding layers 122, 124 may thus be used to adhesively secure one or more films, layers, or structures to the light guide layer 120.

In the example of FIG. 1, the front cladding layer 122 adhesively secures a diffuser film 132 to the light guide layer 120 of the backlight unit 118. Additional, fewer, or alternative films or layers may be secured via the front cladding layer 122. For example, diffuser structures may alternatively be embedded, suspended, or otherwise incorporated into the front cladding layer 122.

In the example of FIG. 1, the rear cladding layer 124 adhesively secures a turning film 134 to the light guide layer 120. The turning film 134 carries or includes an array of turning structures. The turning structures may be disposed along the rear cladding layer 124 as described below in connection with FIG. 2. Additional, fewer, or alternative films or layers may be secured via the rear cladding layer 124. For example, the turning structures may be carried by a recycling film or other film or layer.

Lamination or other bonding of the constituent films or layers of one or more of the units 114, 116, 118 may increase the solidity and/or rigidity of the display module 106 and, thus, the device assembly. For instance, the lamination and resulting absence of air gaps within the backlight unit 118 may lead to a rigid and robust device. The rigidity of the display module 106 may support the transparent cover 102. Flexure or deflection of the transparent cover 102 may be minimized or prevented. The lack of flexure may protect the fragile films and layers of the units 114, 116, 118 of the display module 106 during use.

In the example of FIG. 1, the lack of flexure of the transparent cover 102 may also protect the electronic module 112 and other internal components from adverse impact effects. If the transparent cover 102 is allowed to deflect during use (e.g., a touch event), then the electronics module 112 may impact another internal component, resulting in damage to the electronics module 112 and/or the other component. The lack of flexure allows the device 100 to be assembled without having to insert foam or other protection layers between internal components of the device 100. The lack of foam or other protection layers, e.g., between the display module 106 and the electronics module 112, may lead to a thinner device profile.

The adhesive attachment of the constituent films of the display module 106 may protect the constituent films from damage that may otherwise arise from relative movement of, and/or contact between, adjacent films. Taken alone, one or more the films may be fragile, e.g., such as a fragile membrane. For example, the films may be composed of thin acrylic, polycarbonate, or polyester layers. The lamination or other adhesive attachment of the films may support each respective film from both sides. Thus, while individually weak, the combination and lamination of the constituent films may create a more rigid, robust structure. In one example, the adhesive attachment of a film (e.g., a light management film) means that the film is no longer capable of sliding laterally or other movement relative to structures, such as turning structures (e.g., prisms), in or carried on an adjacent film. Sliding over such structures may be capable of damaging the light management film. The structures may also be bent or otherwise damaged through contact. Without such relative movement and contact, improvements in yield and product lifetime may be realized. The adhesive attachment and/or stacking of the internal components may also protect the constituent films from damage that may otherwise arise from the flexure of the transparent cover 102 and/or other events.

The display module 106 may include one or more frames to further support the constituent films or layers of the display module 106. For example, a frame may be disposed along the periphery of the films or layers. In some cases, a number of light sources, such as edge-mounted light emitting diode (LED) devices are carried or otherwise supported by the frame(s). The frame(s) are not shown in the drawing figures for ease in illustration of the display module 106 and other internal components of the device 100.

The display module 106 may be bonded to the internal support 108 with a structural adhesive. The glass or plastic layer of the transparent cover 102 may be secured last, using an optically clear adhesive. The transparent cover 102 may be bonded both to the top surface of the display module 106 (e.g., the upper surface of the touch sensor unit 114) and to the internal support 108.

In the example of FIG. 1, the internal support 108 is tray-shaped. The internal support 108 includes a plate 136, flanges 138 extending upward from edges of the plate 136, and ledges 140 extending outward from the flanges 138. The plate 136 is disposed between the transparent cover 102 and the shell 104, and may extend across the entire lateral extent of a display area of the device 100. The transparent cover 102 may be mounted upon, and secured to, the flanges 138 and the ledges 140. The flanges 138 and/or the ledges 140 may also be secured to the shell 104. The flanges 138 are disposed along sidewalls 142 of the shell 104. The flanges 138 may thus follow the contour of the sidewalls 142 of the shell 104 in other configurations The configuration of the internal support 108 may vary from the example shown in FIG. 1. For example, one or more of the flanges 138 may extend both upward (or forward) and downward (or rearward) from the plate 136. The internal support 102 may thus have an H-shaped cross-section. The number of ledges 140 may also vary. For example, the ledges 140 may extend outward from two opposing flanges 138, rather than all four flanges 138.

The components of the device 100 may be configured to avoid or minimize air gaps when the device 200 is assembled. In the example of FIG. 1, the internal support 108 and the shell 104 may be sized or otherwise configured to avoid or minimize air or other gaps from the transparent cover 102 to the shell 104. With the exception of one or more adhesive films or layers, the display module 106 may be contiguous both with the transparent cover 102 and the internal support 108. The battery 110 may also be contiguous with the internal support 108 and the shell 104. Thus, no air gaps are present along cross-sectional lines oriented into the plane of FIG. 1 that cut through the display module 106 and the battery 110. The device 100 along those cross-sectional lines is effectively constructed as a solid device. The absence of air gaps on either side of the display module 106 may support the transparent cover 102, thereby preventing or minimizing flexure or deflection thereof.

As shown in FIG. 1, the sidewalls 142 of the shell 104 and the flanges 138 of the internal support 108 may be sized to correspond with the cumulative thickness of the internal components of the device 100. For example, the flanges 138 may be sized such that the thickness of an upper internal space above the plate 136 matches the cumulative thickness of the display module 106. The sidewalls 142 and the flanges 138 may be sized such that the thickness of a lower internal space below the plate 136 matches the thickness of the battery 110. The respective thicknesses of the upper and lower internal spaces may differ based on the respective thicknesses of the internal components, as well as on which internal components are disposed on either side of the plate 136.

Due to the strength provided by the lamination and/or the support of the internal support 108, a back cover 144 and other portions of the shell 104 may be composed of one or more low cost, lightweight materials. The shell 104 may or may not be mechanically rigid. The support provided by the internal support 108 provides such flexibility in design. The shell 104 may be formed via plastic injection molding. The back cover 144 may be secured to the other outer components of the device 100, such as the internal support 108, the transparent cover 102, and/or the sidewalls 142 of the shell 10 via adhesive material(s) and/or clips or other fasteners.

The construction and configuration of the device 100 may vary from the example shown in FIG. 1. For instance, the transparent cover 102 may be integrated with one or more components of display module 106. The display module 106 itself may also vary considerably. For example, the display module 106 may or may not be configured as a touchscreen. Different types of display technologies may be used, including, for instance, various types of LCD displays, such as super-twisted nematic and other twisted nematic LCD displays, and various thin-film transistor (TFT) displays.

FIG. 2 depicts an example of the backlight unit 118 in greater detail. The backlight unit 118 may be configured as an assembly of layers and other components bonded to the back of the LCD panel 116 (FIG. 1). As described above, the backlight unit 118 includes the light guide layer (or plate) 120, the front and rear cladding layers 122, 124, the diffuser film 132, and the turning film 134. The backlight unit 118 further includes one or more light sources 150 (e.g., LED sources) and one or more non-imaging concentrators 152 adjacent the light source(s) 150 to inject light into the light guide layer 120. Each light source 150 may be placed against a respective input facet of the non-imaging concentrator 152. The light source(s) 150 and the concentrator(s) 152 are disposed along one or more edges of the light guide layer 120. For instance, respective concentrator structure(s) may be disposed along two opposing edges of the light guide layer 120. Each concentrator 152 constrains light both in the plane of the light guide layer 120 and out of the plane. In some cases, a respective concentrator 152 may be provided for each light source 150. In other cases, each edge of the light guide layer 120 has a single concentrator 152 to accommodate all of the light sources 150 mounted the edge. The concentrator(s) 152 may be discrete from, or integrated with, the light guide layer 120 to any desired extent.

The light guide layer 120 has a front face 154 and a rear face 156. The front face 154 corresponds with the upper or forward facing side of the light guide layer 120, which is closer or proximate to the viewer. The rear face 156 corresponds with the lower or rearward facing side of the light guide layer 120, which is farther or distal from the viewer. The light guide layer 120 may be a film or other plate, such as a thin film having a thickness that falls in a range from about 0.4 mm to about 0.6 mm. Other thicknesses may be used. For instance, the thickness of the light guide layer 120 may vary in accordance with, or as a function of, the aspect ratio of the light source(s) 150.

The light guide plate 120 includes a plurality of extraction features 158. Each structure may be or include an indentation in the rear face 156 of the light guide plate 120. Each indentation may be or include a prism-shaped indentation. For example, each indentation may be a flat-faced prism (e.g., a triangular prism). Each prism may be a shallow prism. Each prism includes an angled face 160 positioned for interaction with the light reflectively propagating down the light guide layer 120. The angled face 160 of each prism may be oriented at a shallow angle relative to the rear face 156. An angle may be considered shallow if the angle falls within a range of about 1 degree to about 5 degrees, such as about 2 degrees.

The indentations may have other shapes. The indentations may be asymmetrical, as opposed to the symmetrical triangular prism shape shown in FIG. 2. For example, each indentation may have a single face oriented at a shallow angle relative to the rear face 156. In such cases, the face of the indentation opposite of the face 160 may be oriented at a non-shallow angle. For example, each indentation may have a right triangular cross-section or other cross-section with a steeper opposite face.

Various aspects of the indentations may vary across the light guide layer 120 in addition or alternate to varying the density. For instance, the angle of the face 160, the height, the width, and/or the length may be varied. One or more of these aspects may be varied (e.g., increased), as the distance from the light source 150 increases to achieve a uniform or other desired output distribution. These and other aspects of the indentations may be varied for purposes other than achieving a desired output distribution.

The extraction features 158 may be distributed across the rear face 156 in an arrangement configured for uniform light extraction. The height and density of the indentations may be set to achieve a uniform output distribution. In some cases, the extraction features 158 may be disposed in a number of rows and columns in a lateral array. The example of FIG. 2 shows a portion of one of the rows of the array, in which position along the row is indicative of the distance from the light source(s) 150. The spacing between adjacent extraction features 158 within the row and, thus, the density of the extraction features 158, may vary as a function of distance from the light source(s) 150. In the example of FIG. 2, the spacing between adjacent features 158 decreases between the first, second, and third features for ease in illustration. The decrease in spacing (e.g., increase in density) may be configured to extract a uniform amount of light as a function of lateral distance from the light source(s) 150. The change in spacing may vary considerably from the example shown. In contrast, the spacing between adjacent features 158 may be uniform in the other lateral direction (e.g., into the paper of FIG. 2). The extraction features 158 may be uniformly spaced in the other lateral direction in cases in which the light source(s) 150 are disposed only along the single edge shown in FIG. 1.

The light guide plate 120 may be composed of, or include, a formable material to allow the indentations to be formed. The light guide layer 120 may be composed of glass, plastic, and/or another material having high (or otherwise) suitable optical transmission. For example, optical polycarbonate films may be used. One example of a polycarbonate material is commercially available as HL-8000 from Mitsubishi Engineering Plastics. Various other plastic materials may be used due to the lightweight and readily formable nature of such materials, but non-plastic materials may also be used.

The light guide layer 120 has a higher refractive index than the cladding layers 122, 124 for propagation of the injected light within the light guide layer 120 through total internal reflection. The refractive index of the light guide layer 120 (or "guide refractive index") may be a high refractive index, such as an index falling within the range of about 1.55 (e.g., cyclic olefin copolymer, COC) to about 1.74 (e.g., Mitsubishi Gas Chemical MGC171). For example, the HL-8000 polycarbonate film has an index of 1.584. The guide refractive index may vary, with, for instance, the composition of the cladding layers 122, 124. Polycarbonate and other materials having a high (or relatively high) index, low coloration, and low cost, may be used.

The light reflectively propagates through the light guide layer 120 until extracted as a result of an encounter with one or more of the extraction features 158. The refractive indices of the cladding layers 122, 124 are offset from one another. The refractive index of the cladding layer 122 is lower than the refractive index of the cladding layer 124. The refractive index of the cladding layer 122 may be offset from the other refractive indices (e.g., the guide refractive index) such that the light encountering the front face 154 after reflection off of the rear face 156 (or one of the extraction features 158) does not pass through the front face 154. Examples are provided below in connection with FIG. 3.

The refractive index of the cladding layer 122 may fall in a range from about 1.29 (e.g., DuPont Teflon AF or Asahi Glass Cytop) to about 1.38 or about 1.41 (e.g., various commercially available silicone materials). The refractive index of the cladding layer 124 is higher than the index of the cladding layer 122, and may fall in a range extending upward from the index of the cladding layer 122. In some cases, the cladding layer 124 may include or be composed of acrylic adhesive materials (e.g., acrylic polyurethane mixtures), such as the Nitto Denko Lucias range of acrylic adhesives, which have indices of about 1.47 or more. The composition and other properties of the cladding layers 122, 124 may vary from the examples provided above. For example, an air gel having an index of about 1.1 may be used as the cladding layer 122. Use of an air gel or similar low index material may support steeper extraction.

Each extraction feature 158 is configured to cause light to be extracted from the light guide layer 120 as a result of the light encountering one or more of the extraction features 158. In operation, the concentrator 152 confines the light entering the light guide layer 120 to a range of propagation angles such that total internal reflection occurs until the light encounters at least one of the extraction features 158. The propagation angle of a light ray is defined relative to either the front or rear face 154, 156. The propagation angle increases by twice the angle of the angled face 160 each time the light encounters (e.g., reflects off of) one of the extraction features 158. With that increase, the light ray becomes more likely to reach or exceed the critical angle of the interface along the rear face 156 and, thus, to exit the light guide layer 120. Until the critical angle is reached, the light continues to reflectively propagate down the light guide layer but at an angle increased in accordance with the face 160 of the extraction feature 158.

The relative index differences between the cladding layers 122, 124 and the light guide layer 120 may provide or ensure that the light is extracted rearwardly (or through the rear face 156). Because the cladding layer 122 has a lower refractive index than the cladding layer 124, the angle at the front face 154 relative to the plane of the front face 154 at which total internal reflection ceases (the "total internal reflection angle") is higher than the angle at the rear face 156. The total internal reflection angle corresponds with the difference between the critical angle of the interface (defined relative to the normal) and 90 degrees. The difference between the total internal reflection angles may be equal to or greater than twice the angle of the angled face so that the light exceeds the total internal reflection angle at the rear face 156 before exceeding the total internal reflection angle at the front face 154. The refractive indices of the cladding layers 122, 124 may be offset from the guide refractive index such that the front face 154 has a total internal reflection angle greater than a total internal reflection angle of the rear face 156 by at least twice the angle of the face 160 of each extraction feature 158. Examples of light rays extracted from the light guide layer 120 as a result of interaction with the extraction features 158 are depicted and described in connection with FIG. 3.

Once light is extracted from the light guide layer 120, the light may travel close to the plane of the light guide layer 120, inside the rear cladding layer 124, until the light intersects one of an array of turning structures 162. Each turning structure 162 may be or include a reflective structure that redirects the light upward toward the LCD panel 116 (FIG. 1). Each turning structure 162 may be symmetrical, so that light returning from the LCD panel 116 (e.g., from a polarization recycling film such as the DBEF or APF films available from 3M Corporation) may be efficiently recycled.

The array of turning structures 162 may be disposed along the rear cladding layer 124. The turning structures 162 may be formed on, or otherwise carried by, or disposed on, a front face of the turning film 134. Each turning structure 162 may be a prism-shaped projection from the turning film 134. For instance, the turning structures 162 may project into the cladding layer 124. Alternatively, the turning structures 162 are formed in, or along a rear face of, the cladding layer 124.

Each turning structure 162 may be a V-groove, regular prism or other structure having a reflective face oriented at an angle relative to the plane of the light guide layer 120 to redirect the light toward the viewer. In some examples, the angle may be about 45 degrees, in contrast to the angle of angled face 160 of each extraction feature 158. The prism of each extraction feature indentation may be shallower (e.g., considerably shallower) than the prism of each turning structure 162. The angle of each turning structure 162 may be fall in a range from about 75 degrees to about 90 degrees, but other angles may be used. For example, the angle may vary based on the amount of refraction that occurs as the light exits the light guide layer 120.

The configuration of the turning structures 162 may vary from the example shown in FIG. 2. For instance, the turning structures 162 may be disposed in a curved arrangement. The film or layer in or on which the turning structures 162 are formed or carried may be globally curved to direct light emitted by the backlight unit 118 toward the viewer's position. A convex curvature may be used to converge the light from outer portions of the backlight unit 118. Hotspots resulting from luminance being only normal to the display may thus be avoided. Other types of turning structures may also be used. In some cases, holographic structures may be formed in a photopolymer layer bounding or otherwise disposed along the cladding layer 124.

The turning structure can also be globally curved, in order, thereby reducing the "hotspot" that can be visible to the user in narrow angle displays. This technique has been previously demonstrated in practical implementations of the device shown in MS 331506.01.

After reflecting off of the turning structures 162, the light passes through the light guide layer 120 and the cladding layer 122. In this example, the light then encounters the diffusing film 132, which bounds the cladding layer 122. The diffusing film 132 may diffuse the light to a slight extent, e.g., to an extent that the viewer is unable to discern the light sources 150 and/or reduce the visibility of the turning structures 162. As a result, the light may remain primarily directed toward the viewer along the direction established by the extraction features 158 and the turning structures 162. Alternatively or additionally, the cladding layer 122 may contain a plurality of diffuser structures.

In some cases, the front and rear cladding layers 122, 124 include respective adhesive materials. For example, the front and rear cladding layers 122, 124 may be composed of respective adhesive materials. The respective adhesive materials may, in turn, have respective refractive indices. In some cases, the adhesive materials may be disposed in a thin film adhesive layer. The thin film adhesive layer may include one or more pressure-sensitive adhesive material(s). Additional or alternative types of adhesive materials and films may be used, including, for instance, moisture or thermally cured adhesive materials. The adhesive materials may be silicone-based, epoxy-based and/or acrylic-based materials. The adhesive materials may be used to laminate adjacent layers of a stack of backlight unit layers.

The adhesive material(s) may be low-index adhesive materials. Examples of low-index adhesive materials include low index silicone materials, such as Shin-Etsu KER 7000 low index silicone encapsulant (refractive index of 1.380) and acrylic adhesives, such as Nitto Denko CS9621T adhesive (refractive index of 1.492), but other materials may be used. The silicone encapsulant may be used as the cladding layer 122, and the acrylic adhesive may be used as the cladding layer 124. A variety of other adhesive materials may be used for either cladding layer 122, 124. In still other cases, the index of refraction of the adhesive materials is about 1.2. Still other materials having refractive indices closer to 1.0 may be used.

As an alternative to an index difference established by different adhesive materials, the front face 154 of the light guide layer 120 may be patterned with longitudinal right angle prism features to establish an effective increase in refractive index that results from off-axis incidence. The longitudinal prisms are used to trap light travelling in the direction of the prisms. The prism features and effective increase may be provided by modeling, pressing, or otherwise applying the prisms into the light guide layer 120. Each prism may be or include a prism structure having an internal angle of about 120 degrees. The prism structure provides an effective change in refractive index that traps upward travelling light reflecting from the extraction features 158, causing a ray bundle within the light guide layer 120 to rotate around the prism axis direction, thereby providing randomization of light within the light guide layer 120. The prisms may be configured in a manner similar to Scotch Optical Lighting Film (SOLF), formerly available from 3M Corporation, or various collimated backlight designs that are commercially available. In these cases, the cladding layers 122, 124 may include, or be composed of, the same adhesive material, although different materials for the cladding layers 122, 124 may also be used.

FIG. 3 shows the backlight unit 118 with a number of exemplary light rays 170-172 to depict the manner in which light is extracted from the light guide layer 120 during operation. Each light ray 170-172 is generated by the light source 150 (FIG. 2) and concentrated by the concentrator 152 (FIG. 2) for entry into, and guiding by, the light guide layer 120. Light emitted from the light source 150 enters the non-imaging concentrator 152. The range of angles produced by the light source 150 is reduced by the concentrator 152 to the point where light is guided by the light guide layer 120 as bounded by the cladding layers 122, 124.

Before encountering one of the extraction features 158, the rays 170-172 reflectively propagate down the light guide layer 120 at angles a1, b1 and c1, respectively. Each angle is defined relative to the plane of the light guide layer 120.

The rays 170-172 present three different extraction scenarios. In the example of FIG. 3, none of the rays 170-172 have encountered one of the extraction features 158 as of the left side of the figure. As a result, each of the angles a1, b1, c1 does not yet exceed the total internal reflection angles at either face 154, 156. The total internal reflection angle is larger at the front face 154 than at the rear face 156 due to the difference in refractive indices. The light rays 170-172 are extracted once the angle of incidence exceeds the total internal reflection angle at the rear face 156 as a result of encountering one or more of the extraction features 158. Light encountering one of the respective extraction features 158 exits the light guide layer 120 either by passing through the extraction feature 158 or through the rear face 156 after reflection off of the extraction feature 158 and subsequent reflection off of the front face 154.

The extraction of the ray 170 proceeds as follows. Of the three angles, the angle a1 of the ray 170 is the largest (or steepest). The angle a1 is maintained as the ray 170 reflects off of the face 156, and then off of the face 154, before encountering one of the extraction features 158. The ray 170 is incident upon the angled face 160 of the extraction feature 158, thereby increasing the angle of incidence by the angle of the face 160. In this example, the resulting angle of incidence exceeds the total internal reflection angle for the interface with the cladding layer 124, as follows:

$$a1+\alpha > TIR \text{ angle},$$

where α is the angle of the face 160. As a result, the ray 170 is refracted out of the light guide layer 120. The ray 170 then reflects off of one of the turning structures 162 for redirection toward the user as shown.

The ray 171 is not as steep as the ray 170. In other words, the propagation angle b1 is not as close to the TIR angle as the propagation angle a1. The ray 171 reflects off of one of the extraction features 158 as shown. As a result, the propagation angle is increased as follows:

$$b1+2\alpha=b2,$$

where b2 is the new propagation angle of the ray 171. The ray 171 then reflects off of the front face 154, as the angle b2 does not exceed the total internal reflection angle at that interface. In contrast, the angle b2 does, in fact, exceed the total internal reflection angle at the rear face 156. The ray 171 thus exits the light guide layer 120. The ray 171 is refracted at the interface before redirection by one of the turning structures 162.

The angle c1 of the ray 172 is the lowest of the propagation angles. In this example, the ray 172 encounters a first one of the extraction features 158, increasing the propagation angle as follows:

$$c1+2\alpha=c2,$$

where c2 is the new propagation angle. The ray 172 then reflects off of the front face 154, and then encounters another one of the extraction features 158. The ray 172 reflects off of the extraction feature 158 because the increase in the angle of incidence is still insufficient to exceed the total internal reflection angle, as shown below:

$$c2+\alpha < TIR \text{ angle}$$

However, upon reflecting off of the extraction feature 158, the ray 172 now has a higher propagation angle, c3, as follows:

$$c2+2\alpha=c3.$$

The ray 172 then reflects off of the front face 154, as the angle c3 does not exceed the total internal reflection angle at that interface. But thereafter, the ray 172 may then exit through the rear face 156 if the angle c3 exceeds the total internal reflection angle established by the cladding layer 124. In such cases, the ray 172 propagates at an angle such that the ray 172 does not encounter the other face or surface of the extraction feature 158 (i.e., the facet opposite the face 160). In some cases, the other face may be oriented at an angle equal to or greater than the internal reflection angle such that the face is shadowed by the face 160. As a result, no rays encounter the other face.

The examples depicted in FIG. 3 show that there are multiple exit paths. One possible exit path involves light being reflected off the angled face 160 of the extraction feature 158, then off the upper face 154, then out through the lower face 156. Another exit path involves light passing through the angled face 160 of the extraction feature 158.

The example of FIG. 3 depicts the selective light extraction of the backlight unit 118. Only light propagating near the total reflection angle is allowed to exit the light guide layer 120. As a result, only a narrow range of propagation angles are extracted. Other light outside of the narrow range of propagation angles continues to reflectively propagate down the light guide layer 120, the angle increasing with each encounter of one of the extraction features 158. Further information regarding an exemplary backlight unit that provides selective extraction of a predetermined range of propagation angles from the light guide layer 120 is provided below.

The difference in the total internal reflection angles at the front and rear faces 154, 156 also supports the selective extraction. The light rays 170-172 are only extracted from the light guide layer 120 in a rearward direction toward the turning structures 162. The refractive indices of the cladding layers 122, 124 may be offset from one another to an extent that corresponds with the difference in the total internal reflection angles and in accordance with the range of propagation angles produced by the concentrator 152 (FIG. 2). Further information regarding the index offset is provided in connection with the example below.

With reference again to FIG. 2, in one example, the light guide layer 120 has an index of 1.6 and is bounded by an index of 1.35 at the front face 154 and an index of 1.41 on the rear face 156. When light enters the light guide layer 120, the largest ray angle (relative to the plane of the light guide layer 120) that exists within the guide is given by:

$$\varphi = \sin^{-1} 1/n_{lg},$$

where $n_{lg}$ is the refractive index of the light guide layer. In this example, with $n_{lg}=1.6$, the largest ray angle is 39 degrees.

Where the light guide layer 120 is bounded by one of the cladding layers 122, 124, the highest angle that transmitted (relative to the plane of the light guide layer 120) is:

$$\varphi_2 = 90 - \sin^{-1} n_c/n_{lg},$$

where $n_c$ is the index of the highest index cladding layer (e.g., the rear cladding layer 124). In this case, the indices are 1.6 and 1.41 respectively, so the highest angle is 28 degrees. Therefore, the concentrator 152 reduces the ray bundle cone angle by at least a factor of 39/28 or 1.4. In general, in optical systems n*d*sin(theta) is conserved (i.e., the Lagrange Invariant), where n is the refractive index, d is the thickness, and theta is the ray angle. In the light guide layer 120, the index is constant, so the thickness change may be determined by setting the equality:

$$d_2 \sin \varphi_2 = d_1 \sin \varphi_1,$$

where $d_1$ is the thickness of the concentrator 152 at the input, and $d_2$ is the thickness of the concentrator 152 at the output.

Re-arranging and substituting for the angles, the equality is as follows:

$$d_2/d_1 = (1/n_{lg}) / \sin\left(90 - \sin^{-1}\frac{n_c}{n_{lg}}\right)$$

The equality shows that, in some cases, the concentrator ratio may become 1. In such cases, the concentrator 152 may not be included in the backlight unit 118. For example, the concentrator ratio may become 1 given a particular pair of indices, such as $n_c=1.3$ and $n_{lg}=1.64$.

Figure 4:
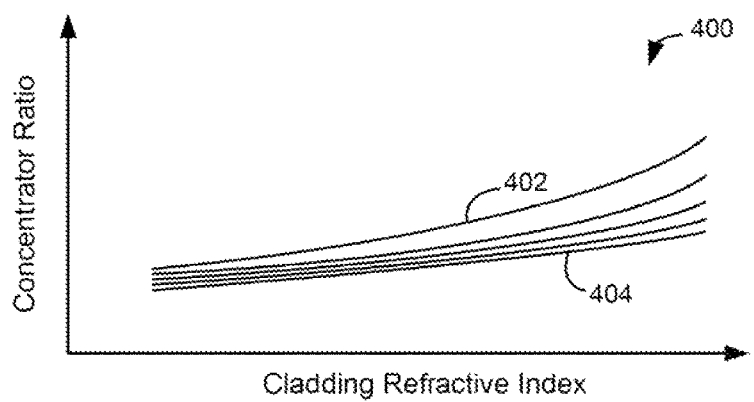
FIG. 4 is a graphical plot of extraction feature angle as a function of a difference in cladding refractive indices in accordance with one example.

FIG. 4 is a plot 400 showing the concentrator ratio as a function of the higher cladding index (e.g., of the cladding layer 124) for a range of guide refractive indices. A curve 402 depicts the concentrator ratio for a highest guide refractive index. A curve 404 depicts the concentrator ratio for a lowest guide refractive index. Further curves are shown for intermediate guide refractive indices. Each of the curves show how lower concentrator ratios are possible as the cladding refractive index decreases.

The manner in which the extraction features 158 (FIGS. 2 and 3) couples light out from the light guide layer 120 is now described in connection with the example. Each extraction feature 158 may be or include a shallow indentation or depression, which is filled with the material of the cladding layer 124. Because the angle of the indentation (e.g., a) is very shallow, only light propagating inside the light guide layer 120 near the total internal reflection angle exits, resulting in a narrow range of angles exiting the light guide layer 120. Other light is reflected from the indentation, which increases the propagation angle by 2a. The increase, in turn, raises the chance that this light will exit the next time the light intersects the rear face 156.

To contain the rays diverted by the extraction feature 158, the material of the cladding layer 122 bounding the front face 154 of the light guide layer 120 has a lower index than that the material of the cladding layer 124 bounding the light guide layer 120 at the rear face 124. The total internal reflection angle at the front face 154 differs from the total internal reflection angle at the rear face 156 by an angle 2a, as expressed below:

$$\sin^{-1}\frac{n_{c1}}{n_{lg}} \geq 2\alpha + \sin^{-1}\frac{n_{c2}}{n_{lg}}$$

The angle of the extraction features 158 is related to the index difference between the cladding layers 122 and 124. The steepness of the extraction features 158 may be established by the condition that all of the light be coupled out of the light guide layer 120 (FIG. 2) by the time the light reaches the end of the light guide layer 120. The steepness and density of the extraction features 158 may be adjusted to achieve the condition.

Figure 5:
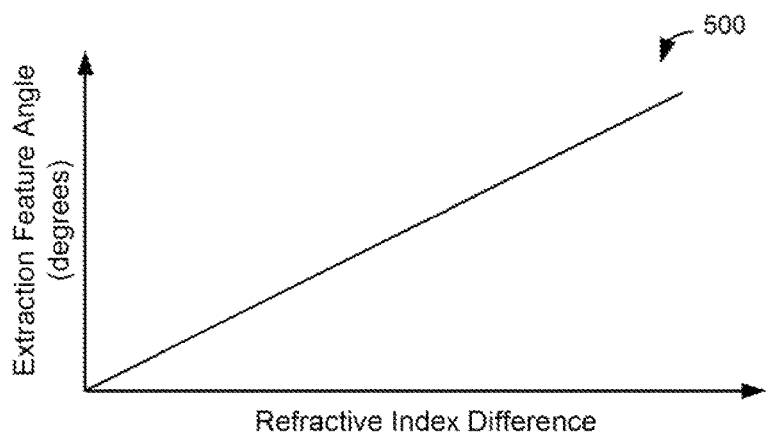
FIG. 5 is a graphical plot of concentrator ratio as a function of cladding refractive index in accordance with one example.

FIG. 5 is a plot 500 that shows the maximum extraction feature angle as a function of the index difference between the two front and rear faces 154, 156 of the light guide layer 120. In one example, assuming a guide refractive index of 1.6, a rear cladding layer index of 1.41, and a front cladding index of 1.35, the maximum allowable extraction feature angle is 2 degrees. As the index difference increases, the maximum angle also increases. The angle of each extraction feature 158, along with the extraction feature density, are two parameters determinative of the rate of extraction of light from the light guide layer 120. Values for the parameters may be determined by numerical simulation. The light extraction rate may be based on additional parameters or factors.

Figure 6:
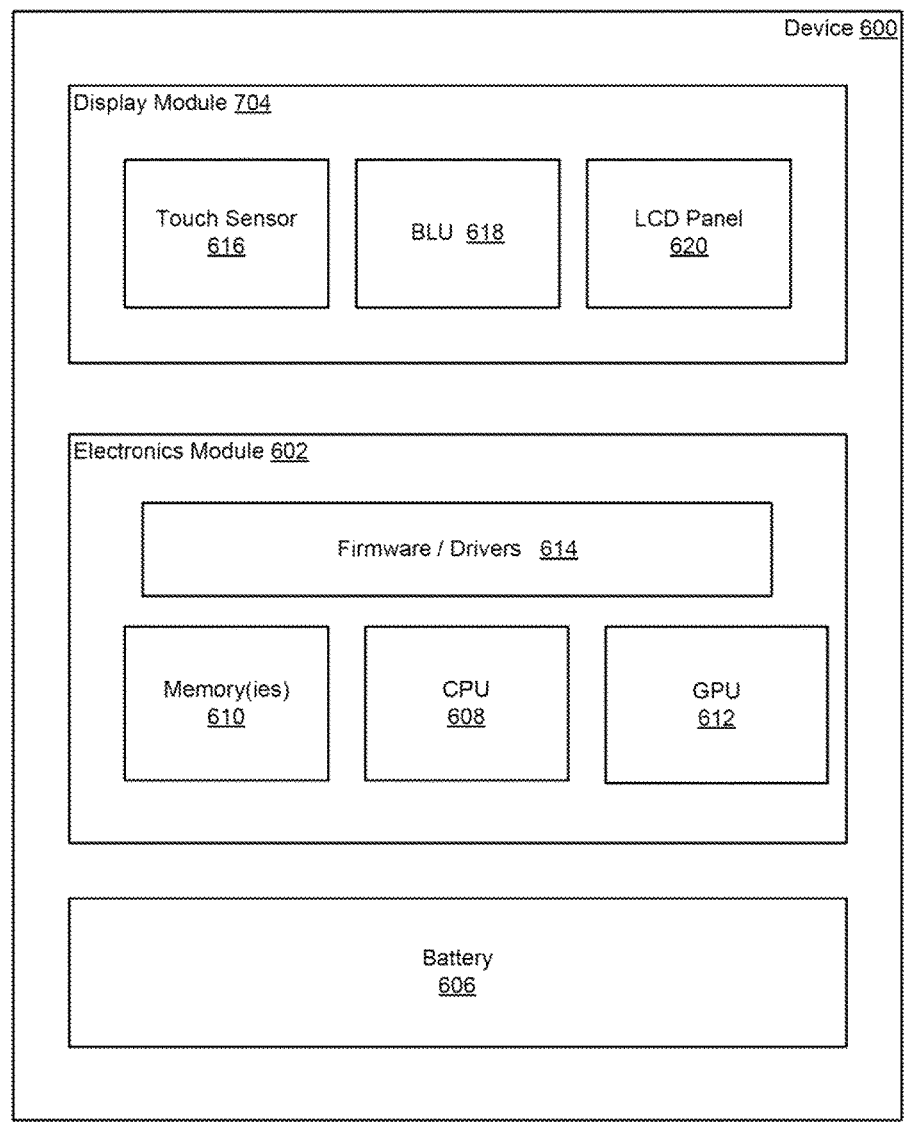
FIG. 6 is a block diagram of an electronic device in which a laminated backlight unit may be used in accordance with one example.

FIG. 6 shows an exemplary electronic device 600 with an electronics module 602 and a display module 604 (or subsystem), and a battery 606. The electronic device 600 may include additional, fewer, or alternative components. For example, the display module 604 may be integrated with the electronics module 602 and/or other components of the electronic device 600 to a varying extent. For instance, the electronics module 602 and/or the display module 604 may include a graphics subsystem of the electronic device 600. Any number of display modules or systems may be included. In this example, the device 600 includes a processor 608 and one or more memories 610 separate from the display module 604. The processor 608 and the memories 610 may be directed to executing one or more applications implemented by the device 600. The display module 604 generates a user interface for an operating environment (e.g., an application environment) supported by the processor 608 and the memories 610. The processor 608 may be a general-purpose processor, such as a central processing unit (CPU), or any other processor or processing unit. Any number of such processors or processing units may be included.

In the example of FIG. 6, the electronics module 602 includes a graphics processing unit (GPU) 612 and firmware and/or drivers 614. The GPU 612 may be dedicated to graphics- or display-related functionality and/or provide general processing functionality. Some of the components of the electronics module 602 may be integrated. For example, the processor 608, the one or more of the memories 610, the GPU 612, and/or the firmware 614 may be integrated as a system-on-a-chip (SoC) or application-specific integrated circuit (ASIC). The electronics module 602 may include additional, fewer, or alternative components. For example, the electronics module 602 may not include a dedicated graphics processor, and instead rely on the CPU 608 or other general-purpose processor to support the graphics-related functionality of the electronic device 600. The electronics module 602 may include additional memory (or memories) to support display-related processing.

In the example of FIG. 6, the display module 604 includes a touch sensor unit 616, a backlight unit (BLU) 618, and an LCD panel or unit 620. The backlight unit 618 may be configured in accordance with one of the examples described above to provide a narrow viewing angle display. Additional, fewer, or alternative display components may be provided. For example, in some cases, the display module 604 does not include the touch sensor unit 616.

The device 600 may be configured as one of a wide variety of computing devices, including, but not limited to, handheld or wearable computing devices (e.g., tablets and watches), communication devices (e.g., phones), laptop or other mobile computers, personal computers (PCs), server computers, set top boxes, programmable consumer electronics, network PCs, minicomputers, mainframe computers, audio or video media players, and other devices. The device 600 may also be configured as an electronic display device, such as a computer monitor, a television, or other display or visual output device.

In one aspect, a backlight unit includes a light guide layer having a front face and a rear face. The light guide layer includes a plurality of extraction features disposed along the rear face of the light guide layer. The backlight unit further includes a first cladding layer adhesively secured to the rear face of the light guide layer, a plurality of turning structures disposed along the first cladding layer, and a second cladding layer adhesively secured to the front face of the light guide layer. The first cladding layer has a first refractive index lower than a guide refractive index of the light guide layer, and the second cladding layer has a second refractive index lower than or equal to the first refractive index. In some cases, the second refractive index is lower than the first refractive index.

In another aspect, a display includes a liquid crystal panel and a laminated backlight unit adhesively secured to the liquid crystal panel. The laminated backlight unit includes a light guide layer including a plurality of extraction features disposed along a rear face of the light guide layer, each extraction feature being configured to cause light propagating through the light guide layer at a propagation angle within a predetermined range of angles to be extracted. The laminated backlight unit further includes a first cladding layer adhered to the rear face of the light guide layer, a plurality of turning structures disposed along the first cladding layer, the plurality of turning structures being configured to redirect the extracted light in a direction that corresponds with the propagation angle, and a second cladding layer adhered to a front face of the light guide layer. The first cladding layer has a first refractive index lower than a guide refractive index of the light guide layer, and the second cladding layer has a second refractive index lower than the first refractive index.

In yet another aspect, a backlight unit includes a light guide layer into which light is injected. The light guide layer includes a plurality of indentations. Each indentation is disposed along a rear face of the light guide layer. Each indentation is configured to cause the light to be extracted from the light guide layer as a result of the light encountering a respective one of the plurality of indentations. Each indentation has a face oriented at an angle relative to the rear face. The backlight unit further includes a first cladding layer that includes a first adhesive material. The first cladding layer is secured to the rear face of the light guide layer via the first adhesive material. The first adhesive material has a first refractive index lower than a guide refractive index of the light guide layer. Each indentation is filled with the first adhesive material. The backlight unit further includes a plurality of turning structures disposed along the first cladding layer, and a second cladding layer that includes a second adhesive material. The second cladding layer is secured to a front face of the light guide layer via the second adhesive material. The second adhesive material has a second refractive index lower than the first refractive index. The first and second refractive indices are offset from the guide refractive index such that the front face has a total internal reflection angle greater than a total internal reflection angle of the rear face by at least twice the angle of the face of each extraction feature.

In connection with any one of the aforementioned aspects, the electronic device may alternatively or additionally include any combination of one or more of the following aspects or features. Each extraction feature may include a respective indentation in the rear face of the light guide layer. Each indentation may include a prism shallower than each turning structure of the plurality of turning structures. The first cladding layer may be composed of an adhesive material having the first refractive index, and each indentation may be filled with the adhesive material. Each turning structure may include a respective prism, and each extraction feature may be shallower than each prism. Each extraction feature may have a face oriented at an angle relative to the rear face, and the first and second refractive indices may be offset from the guide refractive index such that the front face has a total internal reflection angle greater than a total internal reflection angle of the rear face by at least twice the angle of the face of each extraction feature. Each extraction feature may be shaped such that the light encountering the respective extraction feature exits the light guide layer either by passing through the extraction feature or after reflection off of the extraction feature and subsequent reflection off of the front face. The second refractive index may be offset from the guide refractive index such that the light encountering the front face after reflection off of the rear face or one of the extraction features does not pass through the front face. The plurality of turning structures may be disposed in a turning film adhesively secured to the first cladding layer to form a solid film assembly with the light guide layer and the first and second cladding layers. The first and second cladding layers may include first and second adhesive materials, respectively. The first and second adhesive materials may have the first and second refractive indices, respectively. The second cladding layer may include a plurality of diffusing structures suspended within the second adhesive material. The backlight unit may further include a concentrator disposed along an edge of the light guide layer into which the light is injected. The concentrator may be configured such that the light undergoes total internal reflection from the front face until encountering at least one of the plurality of extraction features.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

The foregoing description is given for clearness of understanding only, and no unnecessary limitations should be understood therefrom, as modifications within the scope of the invention may be apparent to those having ordinary skill in the art.

What is claimed is:

1. A backlight unit comprising:
   a light guide layer having a front face and a rear face, the light guide layer comprising a plurality of extraction features disposed along the rear face of the light guide layer, each extraction feature having a face oriented at an angle relative to the rear face;
   a first cladding layer adhesively secured to the rear face of the light guide layer;
   a plurality of turning structures disposed along the first cladding layer; and
   a second cladding layer adhesively secured to the front face of the light guide layer;
   wherein the first cladding layer has a first refractive index lower than a guide refractive index of the light guide layer, and
   wherein the second cladding layer has a second refractive index lower than the first refractive index such that the front face has a total internal reflection angle greater than a total internal reflection angle of the rear face by at least twice the angle of the face of each extraction feature.

2. The backlight unit of claim 1, wherein each extraction feature of the plurality of extraction features comprises a respective indentation in the rear face of the light guide layer.

3. The backlight unit of claim 2, wherein each indentation comprises a prism shallower than each turning structure of the plurality of turning structures.

4. The backlight unit of claim 2, wherein:
   the first cladding layer is composed of an adhesive material having the first refractive index; and
   each indentation is filled with the adhesive material.

5. The backlight unit of claim 1, wherein:
   each turning structure comprises a respective prism; and
   each extraction feature is shallower than each prism.

6. The backlight unit of claim 1, wherein:
   each extraction feature has a face oriented at an angle relative to the rear face; and
   the first and second refractive indices are offset from the guide refractive index such that the front face has a total internal reflection angle greater than a total internal reflection angle of the rear face by at least twice the angle of the face of each extraction feature.

7. The backlight unit of claim 1, wherein each extraction feature is shaped such that the light encountering the respective extraction feature exits the light guide layer either by passing through the extraction feature or after reflection off of the extraction feature and subsequent reflection off of the front face.

8. The backlight unit of claim 1, wherein the second refractive index is offset from the guide refractive index such that the light encountering the front face after reflection off of the rear face or one of the extraction features does not pass through the front face.

9. The backlight unit of claim 1, wherein the plurality of turning structures are disposed in a turning film adhesively secured to the first cladding layer to form a solid film assembly with the light guide layer and the first and second cladding layers.

10. The backlight unit of claim 1, wherein the first and second cladding layers comprise first and second adhesive materials, respectively.

11. The backlight unit of claim 10, wherein the first and second adhesive materials have the first and second refractive indices, respectively.

12. The backlight unit of claim 10, wherein the second cladding layer comprises a plurality of diffusing structures suspended within the second adhesive material.

13. The backlight unit of claim 1, further comprising a concentrator disposed along an edge of the light guide layer into which the light is injected, the concentrator being configured such that the light undergoes total internal reflection from the front face until encountering at least one of the plurality of extraction features.

14. A display comprising:
    a liquid crystal panel; and
    a laminated backlight unit adhesively secured to the liquid crystal panel, the laminated backlight unit comprising:
       a light guide layer comprising a plurality of extraction features disposed along a rear face of the light guide layer, each extraction feature having a face oriented at an angle relative to the rear face to cause light propagating through the light guide layer at a propagation angle within a predetermined range of angles to be extracted;
       a first cladding layer adhered to the rear face of the light guide layer;
       a plurality of turning structures disposed along the first cladding layer, the plurality of turning structures being configured to redirect the extracted light in a direction that corresponds with the propagation angle; and
       a second cladding layer adhered to a front face of the light guide layer;
    wherein the first cladding layer has a first refractive index lower than a guide refractive index of the light guide layer, and
    wherein the second cladding layer has a second refractive index lower than the first refractive index such that the front face has a total internal reflection angle greater than a total internal reflection angle of the rear face by at least twice the angle of the face of each extraction feature.

15. The display of claim 14, wherein:
    each extraction feature of the plurality of extraction features comprises a respective indentation in the rear face of the light guide layer;
    the first cladding layer is composed of an adhesive material having the first refractive index; and
    each indentation is filled with the adhesive material.

16. The display of claim 14, wherein:
    each extraction feature has a face oriented at an angle relative to the rear face; and
    the first and second refractive indices are offset from the guide refractive index such that the front face has a total internal reflection angle greater than a total internal reflection angle of the rear face by at least twice the angle of the face of each extraction feature.

17. The display of claim 14, wherein each extraction feature is shaped such that the light encountering the respective extraction feature exits the light guide layer either by passing through the extraction feature or after reflection off of the extraction feature and subsequent reflection off of the front face.

18. A backlight unit comprising:
a light guide layer into which light is injected, the light guide layer comprising a plurality of indentations, each indentation being disposed along a rear face of the light guide layer, each indentation being configured to cause the light to be extracted from the light guide layer as a result of the light encountering a respective one of the plurality of indentations, each indentation having a face oriented at an angle relative to the rear face;
a first cladding layer comprising a first adhesive material, the first cladding layer being secured to the rear face of the light guide layer via the first adhesive material, the first adhesive material having a first refractive index lower than a guide refractive index of the light guide layer, each indentation being filled with the first adhesive material;
a plurality of turning structures disposed along the first cladding layer; and
a second cladding layer comprising a second adhesive material, the second cladding layer being secured to a front face of the light guide layer via the second adhesive material, the second adhesive material having a second refractive index lower than the first refractive index;
wherein the first and second refractive indices are offset from the guide refractive index such that the front face has a total internal reflection angle greater than a total internal reflection angle of the rear face by at least twice the angle of the face of each indentation.

19. The backlight unit of claim 18, wherein each indentation is shaped such that the light encountering the respective indentation exits the light guide layer either by passing through the indentation or after reflection off of the indentation and subsequent reflection off of the front face.

20. The backlight unit of claim 18, further comprising a concentrator disposed along an edge of the light guide layer into which the light is injected, the concentrator being configured such that the light undergoes total internal reflection from the front face until encountering at least one of the plurality of indentations.

* * * * *